(12) United States Patent
    Yokoyama (10) Patent No.: US 10,423,366 B2
(45) Date of Patent: Sep. 24, 2019

(54) INFORMATION PROCESSING APPARATUS HAVING ACTIVE STATUS MANAGEMENT, INFORMATION PROCESSING METHOD, AND STORAGE MEDIUM

(71) Applicant: CANON KABUSHIKI KAISHA, Tokyo (JP)

(72) Inventor: Tatsuyuki Yokoyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/666,453

(22) Filed: Aug. 1, 2017

(65) Prior Publication Data
    US 2018/0046415 A1    Feb. 15, 2018

(30) Foreign Application Priority Data
    Aug. 12, 2016  (JP) ................. 2016-158735

(51) Int. Cl.
    *G06F 8/61*     (2018.01)
    *G06F 8/70*     (2018.01)
    *G06F 3/12*     (2006.01)

(52) U.S. Cl.
    CPC ............ *G06F 3/1207* (2013.01); *G06F 3/126* (2013.01); *G06F 3/1225* (2013.01); *G06F 3/1229* (2013.01); *G06F 3/1259* (2013.01); *G06F 3/1276* (2013.01); *G06F 3/1285* (2013.01); *G06F 3/1288* (2013.01); *G06F 3/1293* (2013.01)

(58) Field of Classification Search
    USPC ................. 358/1.1–3.29, 1.11–1.18
    See application file for complete search history.

(56) References Cited

U.S. PATENT DOCUMENTS

2003/0200427 A1*  10/2003  Kemp .................. G06F 9/4411
                                                        713/1
2017/0163835 A1*   6/2017  Okazawa ................ G06F 8/61

FOREIGN PATENT DOCUMENTS

JP      2010-140281       6/2010

* cited by examiner

*Primary Examiner* — Marcellus J Augustin
(74) *Attorney, Agent, or Firm* — Venable LLP (57) ABSTRACT

An information processing apparatus is connected to an image processing apparatus via a network and includes at least one processor executing instructions to act as an activation control unit configured to activate a status management program for acquiring and displaying information relating to a state of the image processing apparatus, and printer driver configured to generate a print job in the information processing apparatus and unable to activate the status management program in accordance with an instruction to generate a print job. The activation control unit is software that differs from the printer driver and activates the status management program in a case where a print job based on application data issued by an application is generated.

13 Claims, 10 Drawing Sheets

INFORMATION PROCESSING APPARATUS HAVING ACTIVE STATUS MANAGEMENT, INFORMATION PROCESSING METHOD, AND STORAGE MEDIUM

BACKGROUND OF THE INVENTION

Field of the Invention

The present invention relates to an information processing apparatus which is connected to an apparatus such as an image processing apparatus under a network environment, and its control method and program.

Description of the Related Art

In an information processing system in which an information processing apparatus such as a personal computer and an image processing apparatus such as a printer are connected via a network, the information processing apparatus includes a monitoring function (status management program) to monitor the state (status) of the image processing apparatus. The status management program updates the status to latest information, and thus, it is preferable that the status management program acquire status information from the image processing apparatus periodically. However, there may be a case where periodic information acquisition increases network traffic and increases loads for processing the image processing apparatus, thereby reducing the processing speed of the image processing apparatus or the information processing apparatus.

In a printer driver (v3 printer driver) architecture provided by Windows (registered trademark) which is an OS of Microsoft Corporation, there is a system of registering a vendor-specific user interface module to the information processing apparatus. Further, Japanese Patent Laid-Open No. 2010-140281 discloses a configuration in which a DrvDocumentEvent function of a vendor-specific user interface module is called from the OS at the time of starting printing such that the vendor specifically makes customization within the function.

Specifically, applying the invention of Japanese Patent Laid-Open No. 2010-140281 under the conventional Windows printer driver (v3 printer driver) environment can suppress an operation period of the status management program to a minimum. To be more specific, the status management program can be activated, along with a command of starting printing, from the vendor-specific user interface module. Further, the information processing apparatus acquires information associated with the progress of printing and an error occurred in the image processing apparatus via communication with the image processing apparatus and notifies a user of such information. In addition, once the status management program detects that the image processing apparatus has completed its printing operation, the status management program can complete the operation.

As such, in the conventional Windows printer driver (v3 printer driver) architecture, the status management program can be activated only during printing operation of the image processing apparatus or the like.

However, in a Windows printer driver (v4 printer driver) architecture of a next generation, a system of registering the above-described vendor-specific user interface module is not supported. Accordingly, in the Windows printer driver (v4 printer driver) of a next generation, the status management program cannot be activated from the user interface module at the time of starting printing.

The v4 printer driver supports a system of activating the status management program by using a toast notification function which is a notification function of an OS of Windows (registered trademark) of Microsoft Corporation. However, the toast notification in the OS is only displayed for about five seconds in default, and the status management program cannot be activated unless a user clicks the toast during this notification period.

In other words, in the v4 printer driver architecture, the status management program cannot be activated from the v4 printer driver at the time of starting printing. As a result, there may be a risk in which information to be notified is not informed to the user.

SUMMARY OF THE INVENTION

The present invention has been made in consideration of the above problem to be solved, and an object of the present invention is to achieve, even in the v4 printer driver architecture, a situation where a status during operation of the image processing apparatus can be monitored.

According to a first aspect of the present invention, there is provided an information processing apparatus which is connected to an image processing apparatus via a network, the information processing apparatus comprising a control unit configured to activate a status management program for acquiring and displaying information relating to a state of the image processing apparatus, wherein a printer driver who generates a print job in the information processing apparatus cannot activate the status management program in accordance with an instruction to generate a print job, and the control unit is software that differs from the printer driver and activates the status management program in a case where a print job for the image processing apparatus is generated.

According to a second aspect of the present invention, there is provided a control method of an information processing apparatus which is connected to an image processing apparatus via a network, the method comprising a step of causing a control unit to activate a status management program for acquiring and displaying information relating to a state of the image processing apparatus, wherein a printer driver who generates a print job in the information processing apparatus cannot activate the status management program in accordance with an instruction to generate a print job, the control unit is software that differs from the printer driver, and the status management program is activated by using the control unit in a case where a print job for the image processing apparatus is generated.

According to a third aspect of the present invention, there is provided a non-transitory computer-readable storage medium storing a program for causing an information processing apparatus which is connected to an image processing apparatus via a network to perform a control method, the control method comprising a step of causing a control unit to activate a status management program for acquiring and displaying information relating to a state of the image processing apparatus, wherein a printer driver who generates a print job in the information processing apparatus cannot activate the status management program in accordance with an instruction to generate a print job, the status management program is activated by using the control unit in a case where a print job for the image processing apparatus is generated.

Further features of the present invention will become apparent from the following description of exemplary embodiments with reference to the attached drawings.

DESCRIPTION OF THE EMBODIMENTS

First Embodiment

Figure 1:
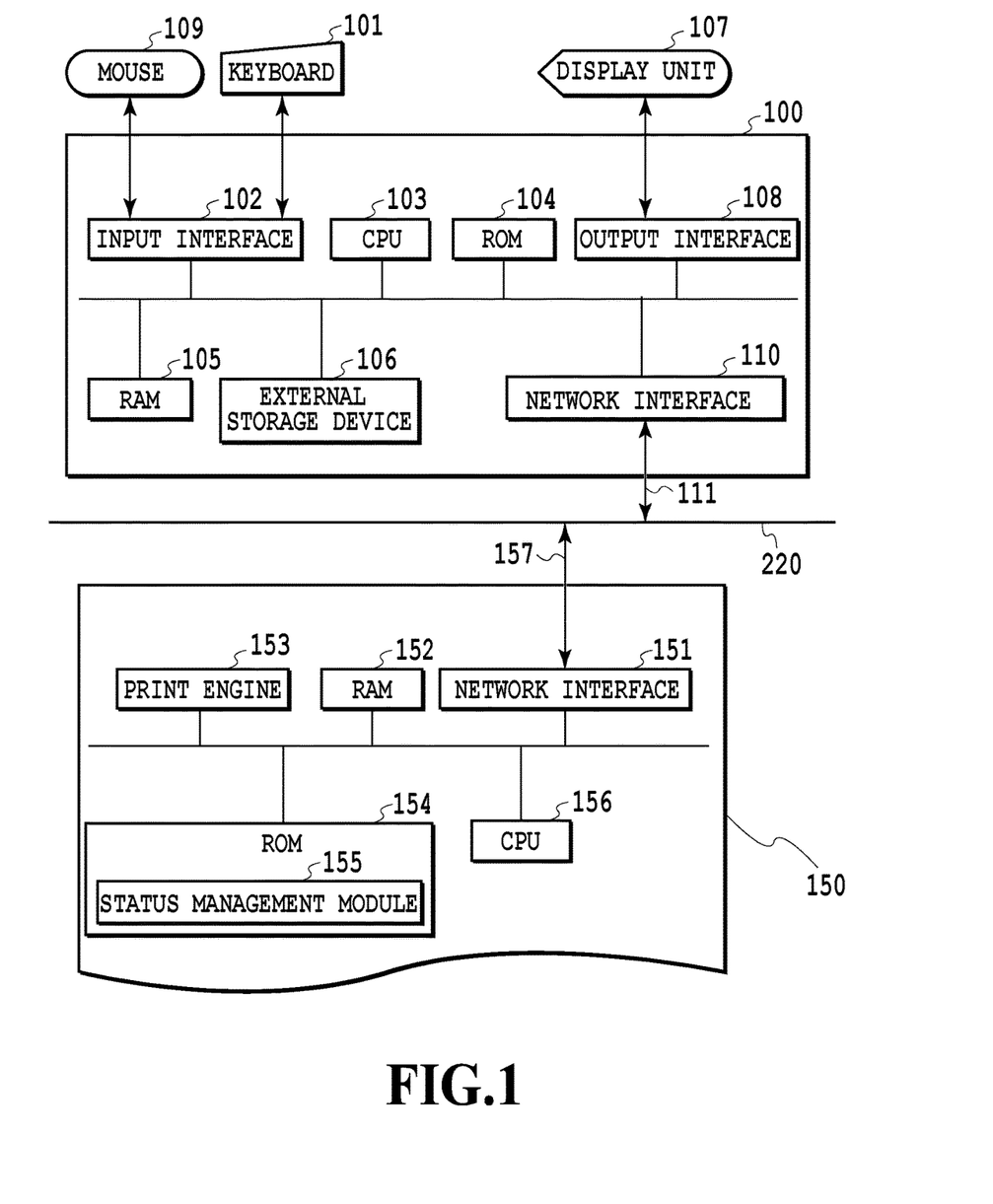
FIG. 1 is a configuration diagram of hardware for an information processing apparatus and an image processing apparatus.

FIG. 1 is a configuration diagram of hardware for an information processing apparatus 100 and an image processing apparatus 150 which are used in the present embodiment. The information processing apparatus 100 includes an input interface 102, a CPU 103, a ROM 104, a RAM 105, an external storage device 106, an output interface 108, a display unit 107, a keyboard 101, a mouse 109, and a network interface 110.

The network interface 110 connects the information processing apparatus 100 to a network 220 via a network cable 111, and information is inputted or outputted between the information processing apparatus 100 and the network 220. The ROM 104 includes an initialization program stored therein, and the external storage device 106 includes an application program group, an operating system (OS), a printer driver, and various other data stored therein. The CPU 103 executes various processing in accordance with various programs stored in the external storage device 106 while using the RAM 105 as a work memory.

The image processing apparatus 150 includes a network interface 151, a RAM 152, a print engine 153, a ROM 154, and a CPU 156. The network interface 151 connects the image processing apparatus 150 to the network 220 via a network cable 157, and information is inputted or outputted between the image processing apparatus 150 and the network 220. The CPU 156 executes various processing in accordance with various programs stored in the ROM 154 while using the RAM 152 as a work area. For example, the CPU 156 temporarily stores image data received via the network 220 in the RAM 152, and activates the print engine 153 to perform printing operation in accordance with the image data.

Among various programs stored in the ROM 154, a status management module 155 has a program for monitoring the state of the image processing apparatus based on information from various sensors included in the image processing apparatus 150. The CPU 156 creates status information of the image processing apparatus based on information from various sensors in accordance with the status management module 155 and stores it in the RAM 152.

Figure 2:
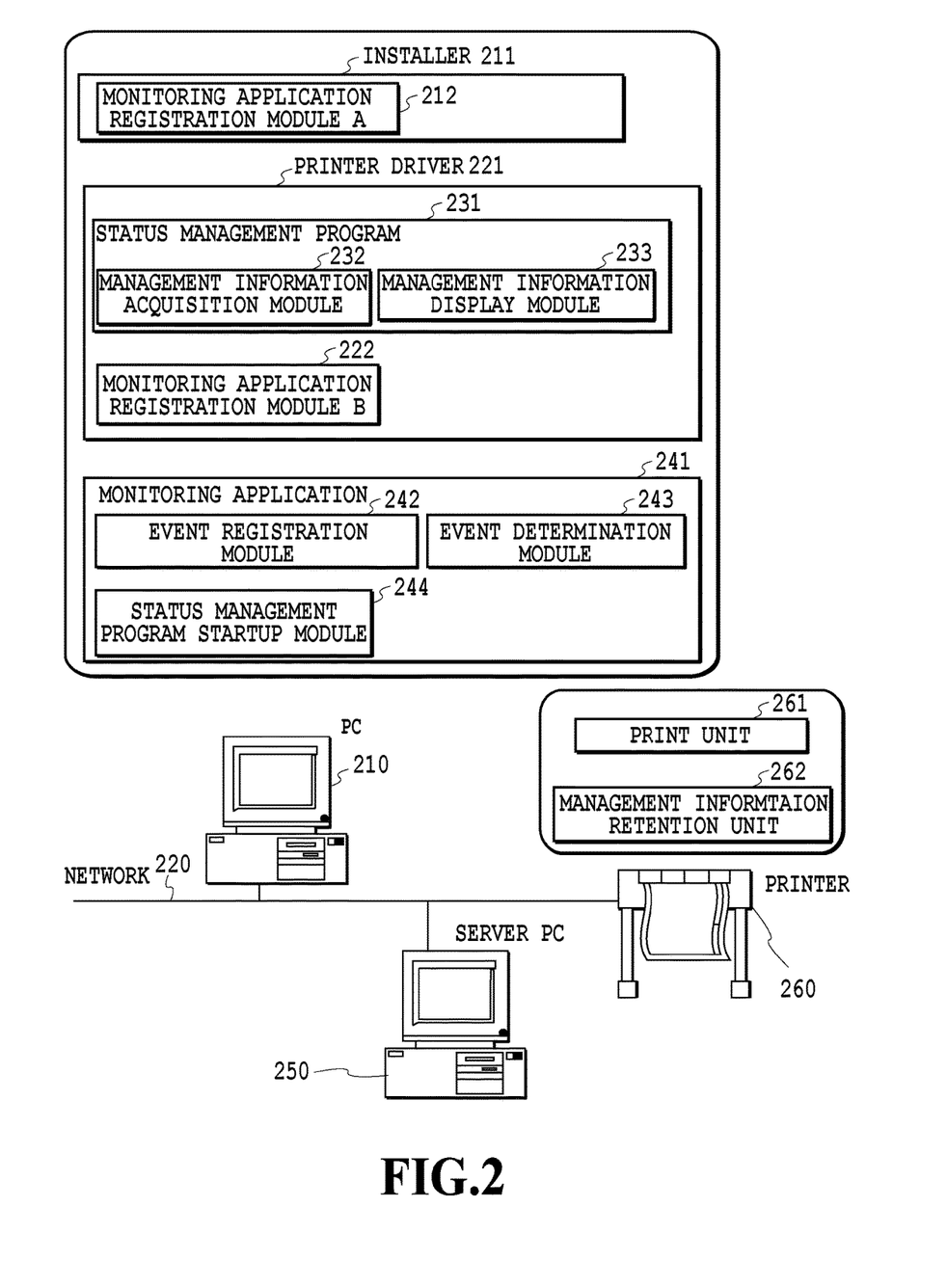
FIG. 2 is a diagram showing a network environment that connects the information processing apparatus and the image processing apparatus.

FIG. 2 is a block diagram showing a network environment that connects the information processing apparatus 100 and the image processing apparatus 150. Here, the state of connection between a PC 210 as the information processing apparatus 100, a printer 260 as the image processing apparatus 150, and a server PC 250, via the network 220, is illustrated, and a configuration of software related to one another is illustrated. However, the network 220 may be further connected to multiple control apparatuses and devices. It should be noted that the CPU of each apparatus executes software described in FIG. 2 so as to achieve processing for each software.

The PC 210 is equipped with an installer 211, a printer driver 221, and a monitoring application 241. The installer 211 is software for installing the printer driver 221 and the monitoring application 241 to the PC 210 upon the startup of the installer 211 by a user. The printer driver 221 is software for causing the printer 260 to perform operation by sending a print job to the printer 260 or for providing information to a user by acquiring the state (status) of the printer 260. The monitoring application 241 is software for monitoring a print queue in the PC 210, and in a case where a change arises in the print queue, the monitoring application 241 analyzes its content. Further, in a case where a factor of the change is inputting of a print job, the monitoring application 241 activates a status management program 231 by notifying the printer driver 221 of the inputting of the print job. Meanwhile, the printer 260 is equipped with a print unit 261 for controlling printing operation and a management information retention unit 262 for retaining the status of the printer 260.

According to the present embodiment, the printer driver 221 may also be installed upon the startup of the installer 211. Alternatively, as another method, the printer driver 221 may also be installed from the server PC 250 for the PC 210 which has been deemed as a client under a Point & Print environment. Further, the PC 210 may also install the printer driver 221 by using a distribution server such as WindowsUpdate.

In a case where the printer driver 221 is installed by the startup of the installer 211, the monitoring application 241 is startup-registered by a monitoring application registration module A 212 within the installer 211. It should be noted that the startup registration refers to storing software such as an application or a link file for software startup in a startup folder managed by the OS. Then, the startup-registered software is, upon user's login, automatically called to be activated as resident software. Meanwhile, in a case where the printer driver 221 is installed without using the installer 211, the monitoring application 241 is startup-registered by a monitoring application registration module B 222 within the printer driver 221. For example, the case in which the server PC 250 regards the PC 210 as a client with Point & Print and installs the printer driver 221 corresponds to the latter case. Alternatively, the case of installing the printer driver 221 from the distribution server such as WindowsUpdate corresponds to the latter case as well.

The status management program 231 in the printer driver 221 includes a management information acquisition module 232 and a management information display module 233. The management information acquisition module 232 accesses the printer 260 to acquire status information of the printer 260 from the management information retention unit 262. The management information display module 233 represents, in a UI display, information required by a user based on status information acquired by the management information acquisition module 232.

Incidentally, as described above, the OS operated by the PC 210 provides an environment where the printer driver itself cannot activate (or limits) the status management program 231 in accordance with receiving an instruction to generate a print job.

Figure 3:
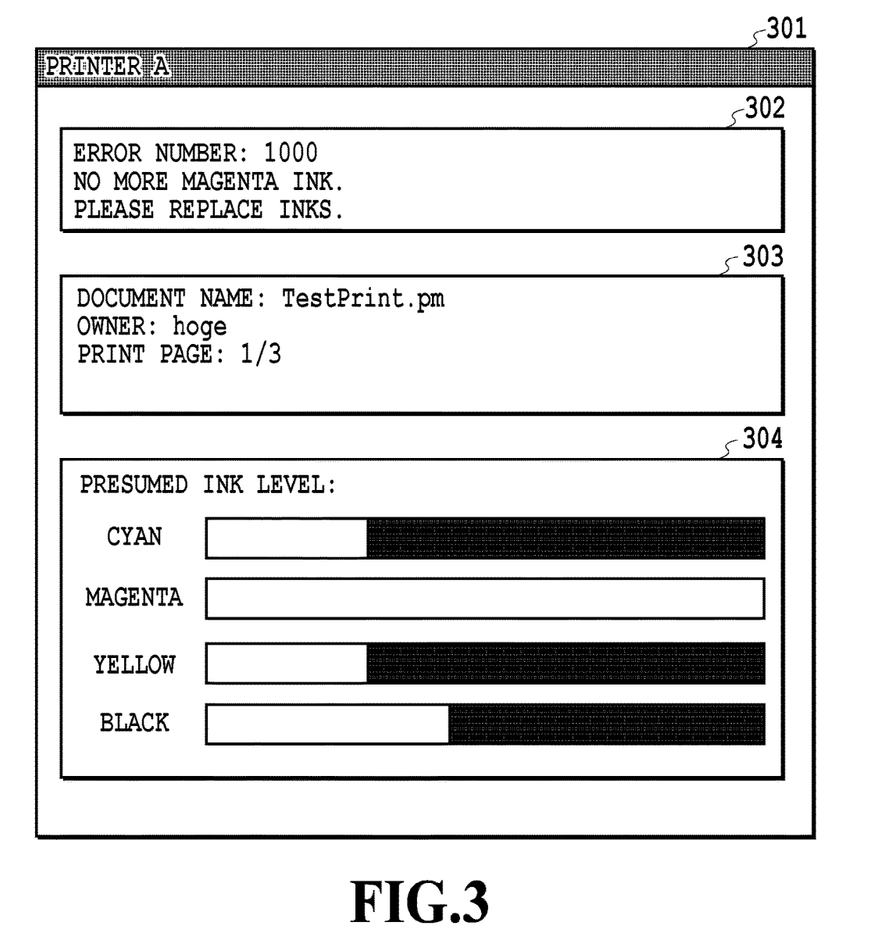
FIG. 3 is an example of a UI display by a status management program.

FIG. 3 is an example of the UI display by the status management program 231. A title bar 301 displays the name or the like of a printer. A message display part 302 informs a user the state of the printer 260 based on information acquired by the management information acquisition module 232. A job information display part 303 displays the progress state of printing operation based on information acquired by the management information acquisition module 232. An ink information display part 304 displays the state of ink consumption used by the printer 260 based on information acquired by the management information acquisition module 232. By confirming such information, the user can grasp the progress state of a print job, can confirm a timing of replacing inks or a kind of ink to be replaced, and can recognize the presence/absence of an error occurrence. Such information is particularly effective during operation of the printer.

Returning to FIG. 2, the monitoring application 241 includes an event registration module 242, an event determination module 243, and a status management program startup module 244. The event registration module 242 executes event registration and management with respect to a print queue to be monitored in the PC 210. According to the present embodiment, the print queue in the PC 210 is registered as one of the targets to be monitored. Once a print job is inserted into the print queue, the print job is then sent to the printer 260. The event determination module 243 detects the occurrence of an event in the print queue registered by the event registration module 242, and analyzes it to determine whether its content is accompanied by the inputting of the print job. Specifically, this determination processing is achieved by analyzing whether a new print job has been inputted. Upon receiving a result of determination of an event by the event determination module 243 and in a case where the event has been accompanied by the inputting of the print job, the status management program startup module 244 activates the status management program 231.

As such, the monitoring of the print queue in the PC 210 and the information display shown in FIG. 3 are implemented by activating, upon the event occurrence, the status management program 231 of the printer driver 221 by the status management program startup module 244. For this reason, it is desirable that the monitoring application 241 be startup-registered irrespective of the method of installing the printer driver 221.

Figure 4:
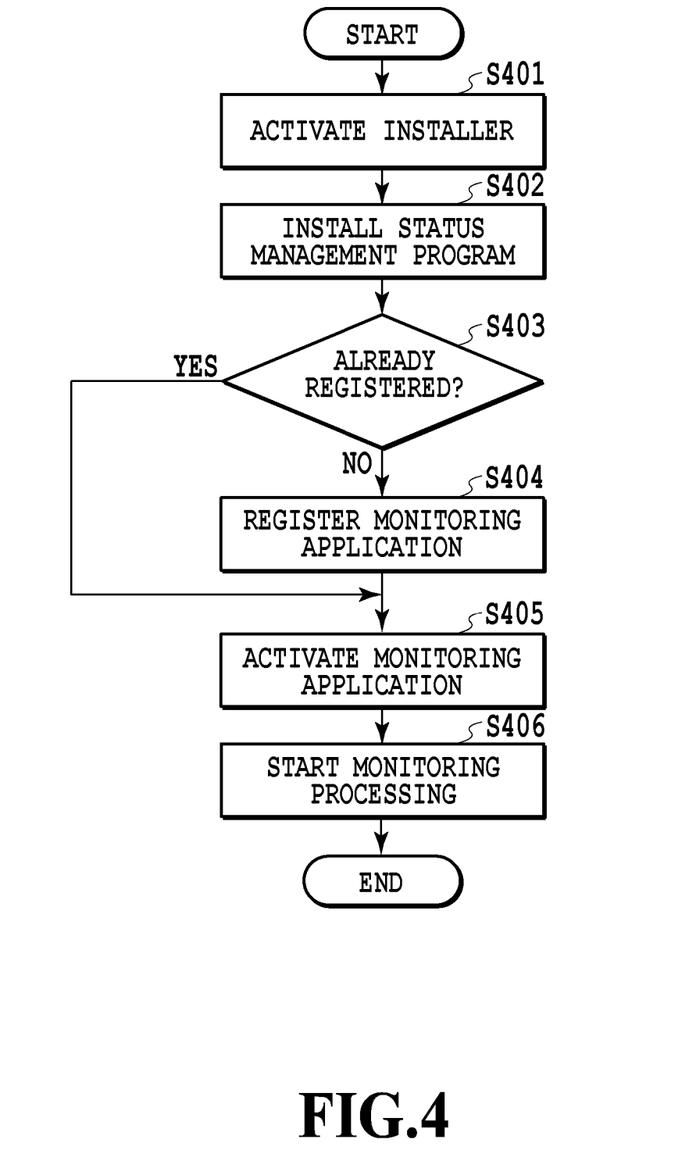
FIG. 4 is a flowchart showing processing along with the startup of an installer.

FIG. 4 is a flowchart showing processing that is implemented when a control unit (CPU 103) of the PC 210 executes the installer 211 in a case where a startup command of the installer 211 is inputted by a user. At the start of the processing, the installer 211 is activated in Step S401, and then the installer 211 installs, in Step S402, the status management program 231 together with the printer driver 221.

In Step S403, the installer 211 confirms whether the monitoring application 241 is already registered in the PC 210. Specifically, the installer 211 confirms whether the monitoring application 241 exists in a startup folder of a login user managed by the OS. In a case of determining not to be registered yet, the process proceeds to Step S404, and the installer 211 uses the monitoring application registration module A 212 to startup-register the monitoring application 241 and the process proceeds to Step S405. On the other hand, in a case where the installer 211 determines that the monitoring application 241 is already registered, the process jumps to Step S405. Execution of the processing of S404 allows the monitoring application 241 to be stored in the startup folder of the login user managed by the OS.

In the following Step S405, the installer 211 starts the monitoring application 241 to further activate monitoring processing in Step S406. Then, the processing ends.

Figure 5:
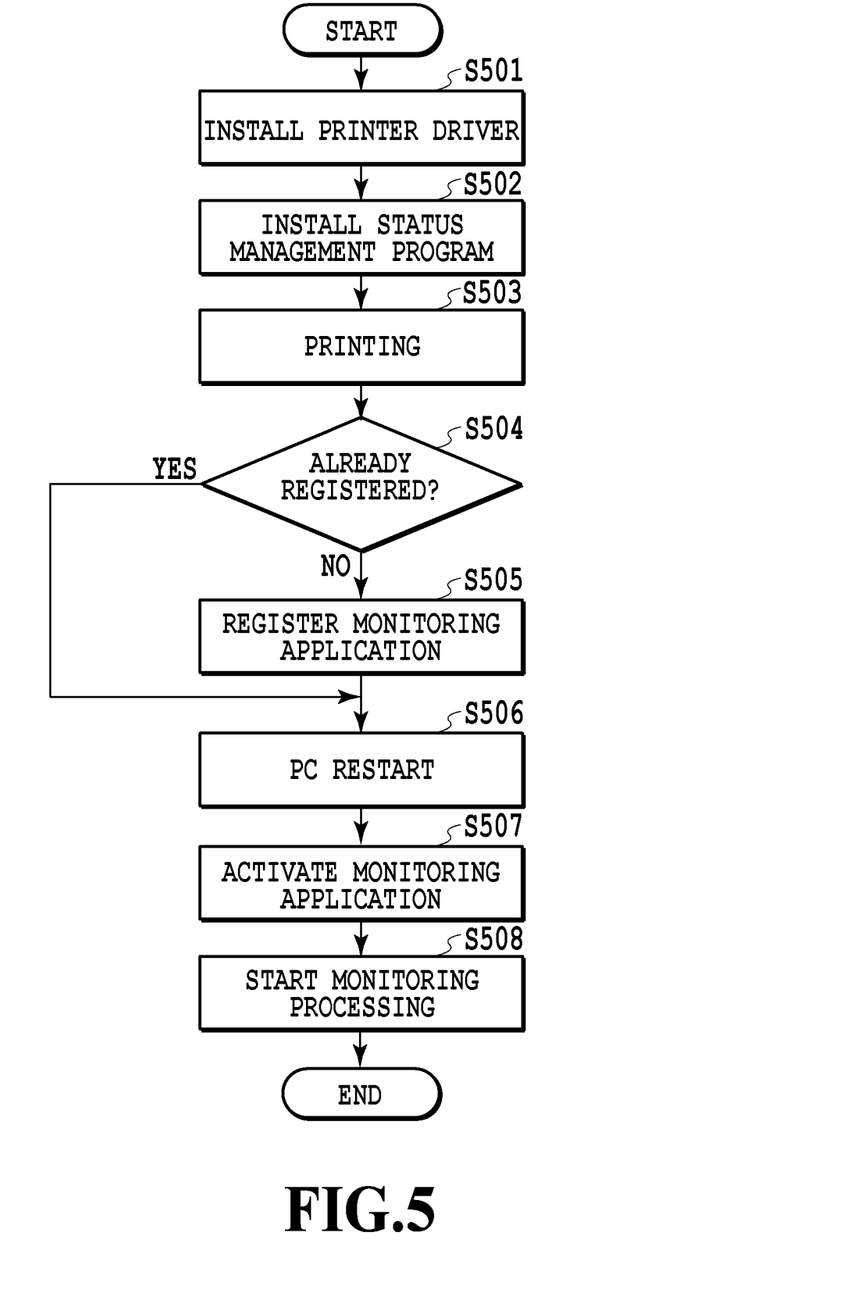
FIG. 5 is a flowchart showing an example of processing without the startup of the installer.

FIG. 5 is a diagram of an example for illustrating the printer driver 221 without using the installer 211. Specifically, FIG. 5 is a flowchart processed by a control unit (CPU 103) in a state where the PC 210 installs the printer driver 221 without using the installer, and after the completion of the installation, a print command is inputted by a user. It should be noted that inputting the print command corresponds to, for example, selecting, by the user, a printer driver using the UI of an application and instructing to execute printing.

At the start of the processing, the CPU 103 firstly installs the printer driver 221 in Step S501. Specifically, the PC 210 retrieves a printer managed by a distribution server such as the WindowsUpdate or the server PC 250 under the Point & Print environment and installs the printer driver 221 of the printer selected from the result of the retrieval.

Then, the CPU 103 proceeds to Step S502 to install the status management program 231. After proceeding to Step S503 and the print command is inputted by the user, the printer driver 221 executes printing operation in accordance with the print command that is received by using a filter module of the printer driver installed in Step S501. Specifically, the CPU 103 uses the printer driver 221 to generate a print job from application data issued by the application and sends it to the printer 260 via a print queue.

In Step S504, the CPU 103 confirms whether the monitoring application 241 is already registered to the PC 210. Specifically, the CPU 103 confirms whether the monitoring application 241 exists in the startup folder of the login user managed by the OS. In a case of determining not to be registered yet, the process proceeds to Step S505, and the CPU 103 uses the monitoring application registration module B 222 to register the monitoring application 241. Specifically, the CPU 103 makes a copy of the monitoring application registration module B 222 of the printer driver 221 and stores it in the startup folder of the login user managed by the OS. As a result of this processing, the monitoring application 241 is startup-registered. On the other hand, in a case where the monitoring application 241 is determined to be already registered in Step S504, the process jumps to Step S506.

In Step S506, the CPU 103 restarts the PC 210, and in Step S507, the CPU 103 activates the monitoring application registered in Step S505. Further, the monitoring processing starts in Step S508, and the processing ends.

Figure 6:
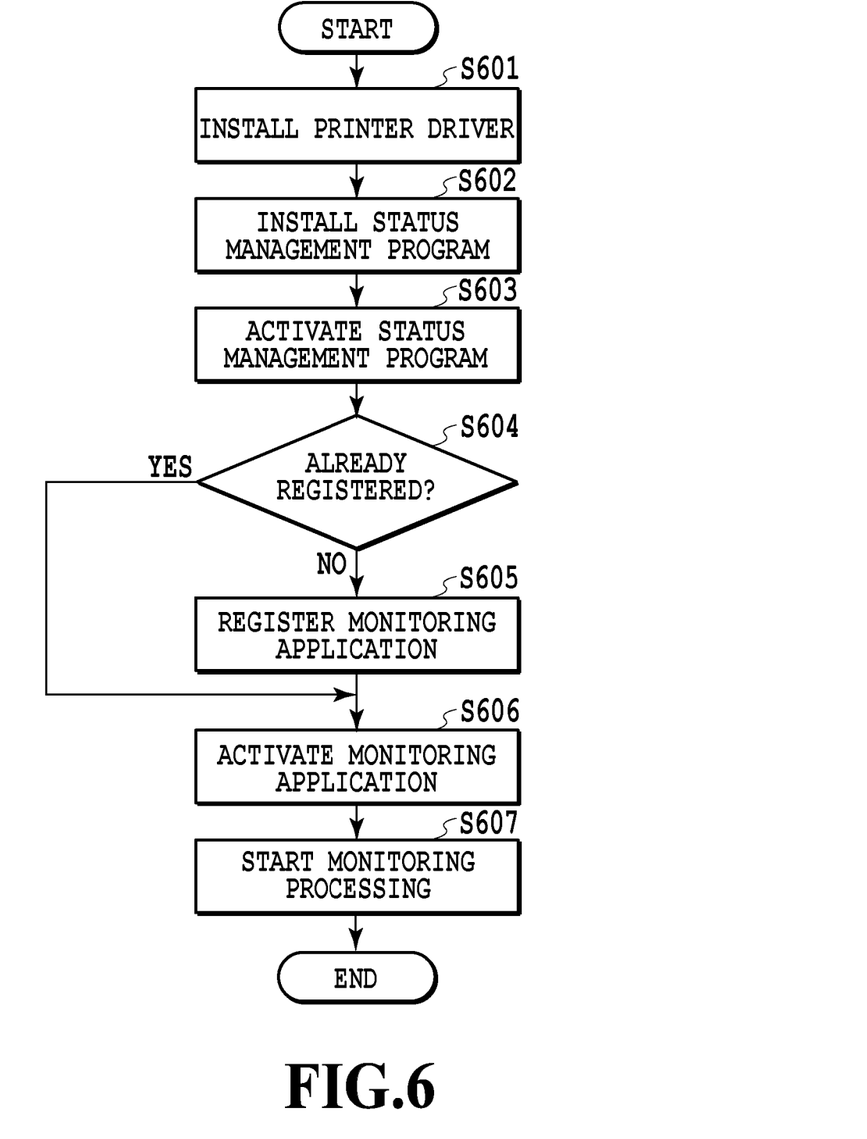
FIG. 6 is a flowchart showing another example of processing without the startup of the installer.

FIG. 6 is a diagram of another example for illustrating the printer driver 221 without using the installer 211. Specifically, FIG. 6 is a flowchart processed by the control unit (CPU 103) in a case where a user installs the monitoring application together with the printer driver 221 to make the startup registration.

At the start of the processing, the CPU 103 firstly installs the printer driver 221 in Step S601. A specific explanation is omitted as the processing is the same as that in S501. Further, in Step S602, the CPU 103 installs the status management program 231, and in succeeding Step S603, the CPU 103 activates the installed status management program 231.

In succeeding Step S604, the CPU 103 confirms whether the monitoring application 241 is already startup-registered. A specific explanation is omitted as the processing is the same as that in S504. In a case of determining not to be registered yet, the process proceeds to Step S605, and the CPU 103 uses the monitoring application registration module B 222 accompanied by the status management program 231 to startup-register the monitoring application 241. Specifically, the monitoring application 241 is copied to the startup folder of the login user of the OS. On the other hand, in a case where the monitoring application 241 is determined to be already registered, the process jumps to Step S606.

Thereafter, in Step S606, the CPU 103 activates the monitoring application, and in Step S607, the CPU 103 starts monitoring processing, and the processing ends. In the present embodiment, as described in FIG. 4 through FIG. 6 above, various methods can be used to install and register the printer driver 221 and the monitoring application 241.

Figure 7:
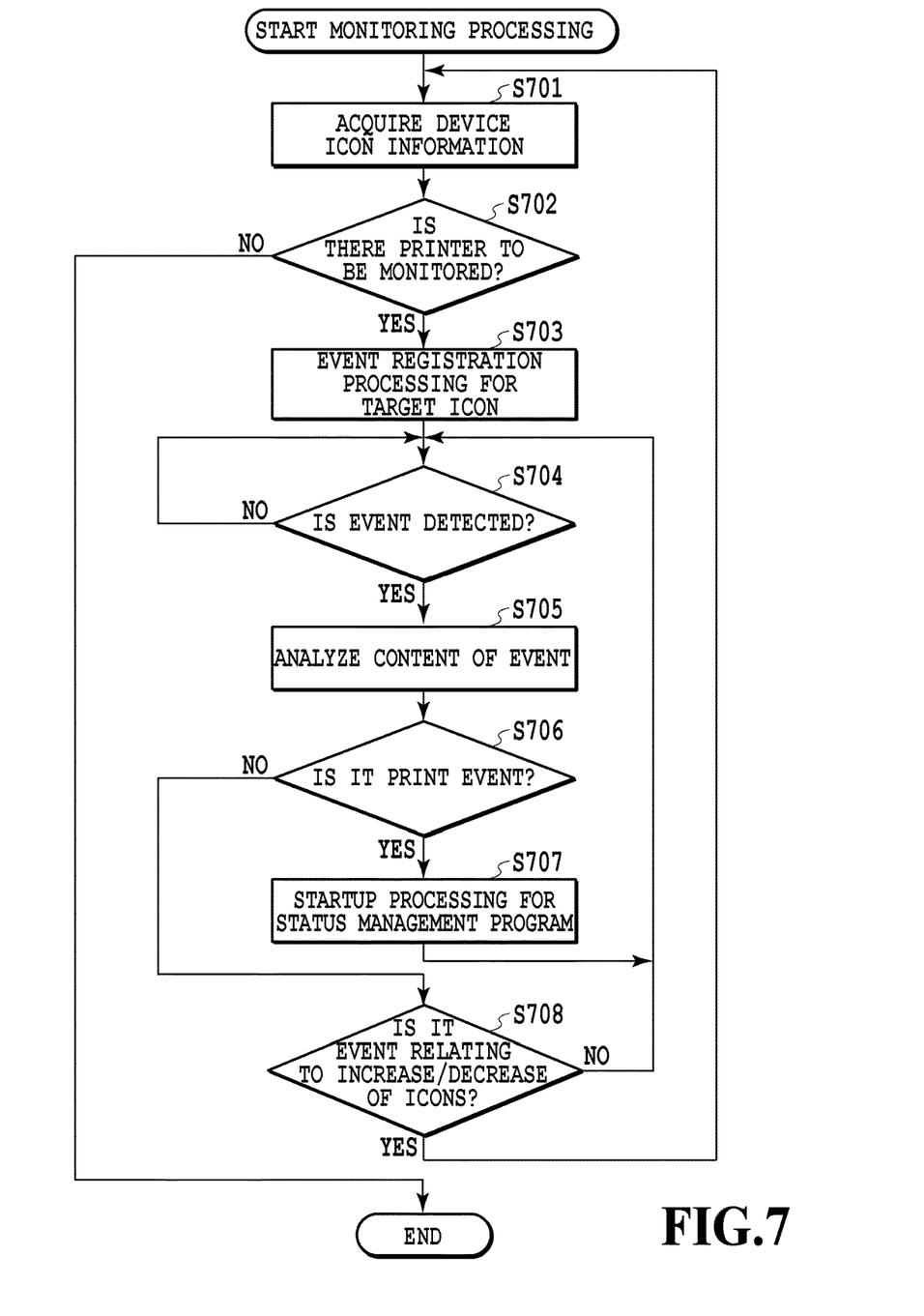
FIG. 7 is a flowchart for illustrating monitoring processing for a printer.

FIG. 7 is a flowchart for illustrating monitoring processing of a print queue in the PC 210, which is implemented when the control unit (CPU 103) of the PC 210 executes the monitoring application 241. It should be noted that the processing of FIG. 7 starts from the above-described S406, S508, and S607. At the start of the processing, the monitoring application 241 firstly uses the event registration module 242 in Step S701 to acquire information such as the name of a printer driver or the name of a port corresponding to a device icon (print queue) stored in a device folder. In Step S702, the monitoring application 241 determines, based on the information such as the name of the printer driver or the name of the port acquired in Step S701, whether the device icon (print queue) to be monitored exists. In other words, the monitoring application 241 retains information relating to a printer to be monitored, and by comparing such retained information with the information acquired in S701, the determination of S702 is made. In a case where the device icon (print queue) to be monitored does not exist, the processing ends. Meanwhile, in a case where the device icon (print queue) to be monitored exists, the process proceeds to Step S703. Then, in S703, the monitoring application 241 uses the event registration module 242 to execute processing of registering an event with respect to the device icon (print queue) determined to be monitored.

In the registration processing of Step S703, a FindFirstPrinterChangeNotification function, for example, provided by the OS can be used. In a case where an event occurs in the device icon determined to be monitored, the monitoring application 241 uses the above-described function to register the event to a spooler so as to enable the spooler to inform the event occurrence. Due to this processing, in a case where, for example, the spooler detects an event such as inputting of a print job to a print queue corresponding to the printer 260 to be monitored, the spooler notifies the monitoring application 241 of the event occurrence. As a result, the monitoring application 241 recognizes the inputting of the print job to the print queue corresponding to the printer 260 to be monitored and thus can execute determination processing of S704 as will be described later.

In Step S704, the monitoring application 241 uses the event determination module 243 to enter into the state of monitoring the event occurrence. Once the event determination module 243 detects the event under surveillance, the monitoring application 241 proceeds to Step S705, and uses the event determination module 243 to analyze information on the event occurrence.

In Step S706, the monitoring application 241 determines, based on the result of the analysis in Step S705, whether the detected event is an event relating to a printing. In a case of determining to be the event relating to the printing, the process proceeds to Step S707. In S707, the monitoring application 241 uses the status management program startup module 244 to activate the status management program 231. Then, the monitoring application 241 returns to the event monitoring state of Step S704 so as to detect the occurrence of a new event.

On the other hand, in a case where the detected event is determined not to be the event relating to the printing in Step S706, the process jumps to Step S708, and the monitoring application 241 determines whether the detected event is an event accompanied by the increase/decrease of the device icons. In a case where the event is accompanied by the increase/decrease of the device icons, the process returns to Step S701 to acquire latest information such as the name of a printer driver or the name of a port corresponding to the device icon. This is because that, in the case where the event is accompanied by the increase/decrease of the device icon, it is necessary to determine whether the processing of S703 is required again, and thus the processing returns to S701. In a case where the event is not accompanied by the increase/decrease of the device icons, the process returns to the event monitoring state in Step S704.

As described above, in the present embodiment, the monitoring application 241 that is separate from the printer driver 221 is prepared. As a result, along with the event occurrence in the print queue in the PC 210, the status management program corresponding to the print queue in the printer 260 to be monitored can be activated. Accordingly, the status management program is no longer required to be resident, and instead of increasing network traffics more than necessary, a user can grasp the status of a required apparatus (printer) at a required timing.

Further, according to the present embodiment, a module for installing the monitoring application to the information processing apparatus is provided not only in the installer 211 but also in the printer driver 221. Therefore, regardless of any steps in which the printer driver 221 itself is installed, the monitoring application 241 can be installed in the information processing apparatus. In other words, irrespective of versions of the OS or whether the installer is used or not, the status of the image processing apparatus can be monitored at an appropriate timing.

Second Embodiment

Figure 8:
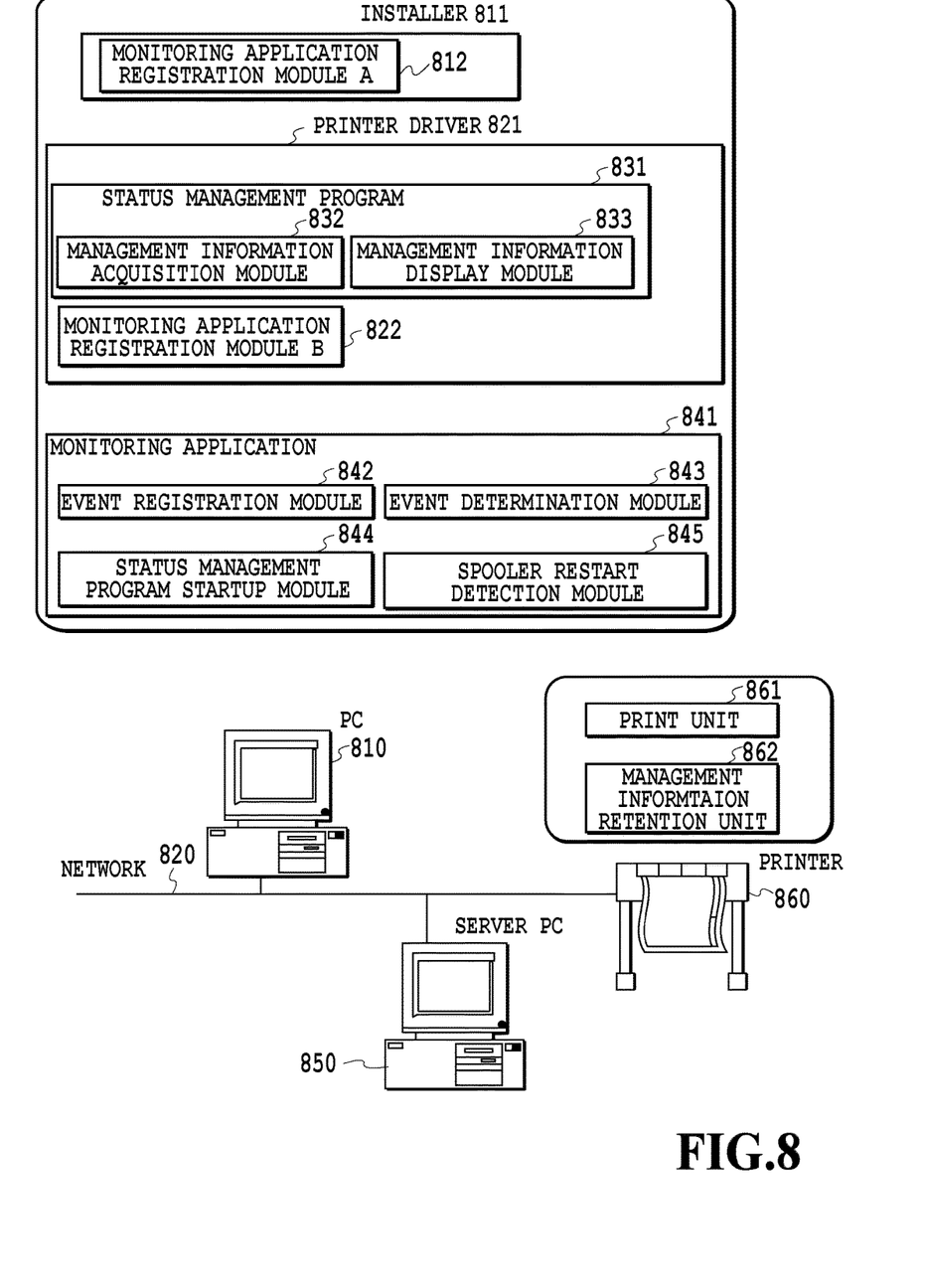
FIG. 8 is a diagram showing a network environment according to a second embodiment.

FIG. 8 is a diagram showing a network environment according to the present embodiment. A different aspect from the first embodiment is that a monitoring application 841 further includes a spooler restart detection module 845. It should be noted that the information processing apparatus 100 and the image processing apparatus 150 described in FIG. 1 are also used in the present embodiment. In addition, the registration of the monitoring application 841 should also be made in accordance with the flowcharts described in FIG. 4 through FIG. 6.

In the first embodiment, as in Step S703 in FIG. 7, the FindFirstPrinterChangeNotification function provided by the OS is used to make event registration processing. However, in a case of adopting this method, once the spooler restarts, the event registration becomes disabled. In other words, once the spooler restarts, there may be a risk in which the monitoring application 241 cannot activate a status management program corresponding to the print queue of the printer 260 to be monitored. It should be noted that the restart of the spooler occurs by, for example, a user's instruction. In addition, the restart of the spooler may occur in a case where a new printer driver is installed. For this reason, in the present embodiment, the spooler restart detection module 845 is provided to reregister event information at a timing at which the restart of the spooler is detected.

Figure 9:
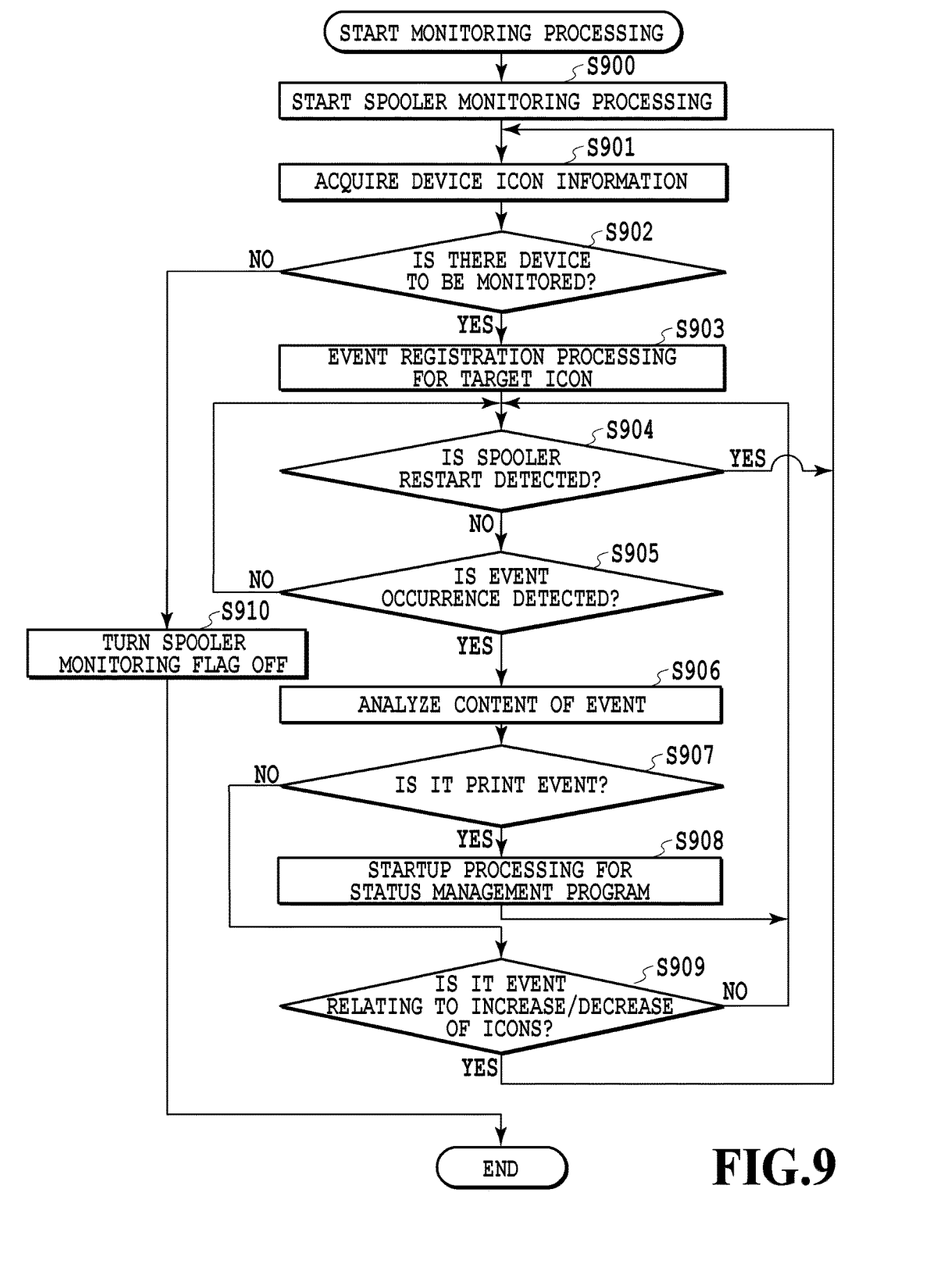
FIG. 9 is a flowchart for illustrating monitoring processing for the printer.

FIG. 9 is a flowchart showing monitoring processing to be executed by the CPU 103 of a PC 810 using the monitoring application 841 in the present embodiment. At the start of the processing, the monitoring application 841 uses the spooler restart detection module 845 in Step S900 to start spooler monitoring processing. The spooler monitoring processing will be explained later in detail.

At the start of the spooler monitoring processing, the monitoring application 841 executes the steps of processing in Steps S901 and S902. However, as such steps of processing are identical to those in S701 and S702, a specific explanation will be omitted. In a case where a device icon (print queue) to be monitored does not exist, the process proceeds to Step S910 to set a spooler monitoring flag off, and the processing ends. In the present embodiment, as a result of setting the spooler monitoring flag off, the spooler restart detection module 845 confirms this setting, and the spooler monitoring processing started in Step S900 ends.

On the other hand, in a case where the device icon (print queue) to be monitored in Step S902 is determined to exist, the process proceeds to Step S903. Then, the registration processing of an event for the device icon (print queue) determined to be monitored is executed by using the event registration module. In this case, the FindFirstPrinterChangeNotification function provided by the OS is used.

In Step S904, the monitoring application 841 uses the spooler restart detection module 845 to determine whether the restart of the spooler is detected. In a case of determining to be detected, the process returns to Step S901 so as to acquire information such as the name of a printer driver or the name of a port corresponding to the device icon (print queue) again. On the other hand, in a case where the restart of the spooler is not detected, the process proceeds to Step S905.

In Step S905, the monitoring application 841 uses an event determination module 843 to determine whether the occurrence of an event is detected. If the event determination module 843 is determined that the event is detected, the monitoring application 841 proceeds to Step S906 and analyzes the content of the event using the event determination module 843. On the other hand, in a case where the event determination module 243 does not detect an event, the process returns to Step S904. Steps S904 and S905 are repeated until at least one of the restart of the spooler or the occurrence of an event is detected, and the state of monitoring by the monitoring application 841 continues.

As Steps S906 through S909 in FIG. 9 are identical to Steps S705 through S708 in FIG. 7, a specific explanation will be omitted.

Figure 10:
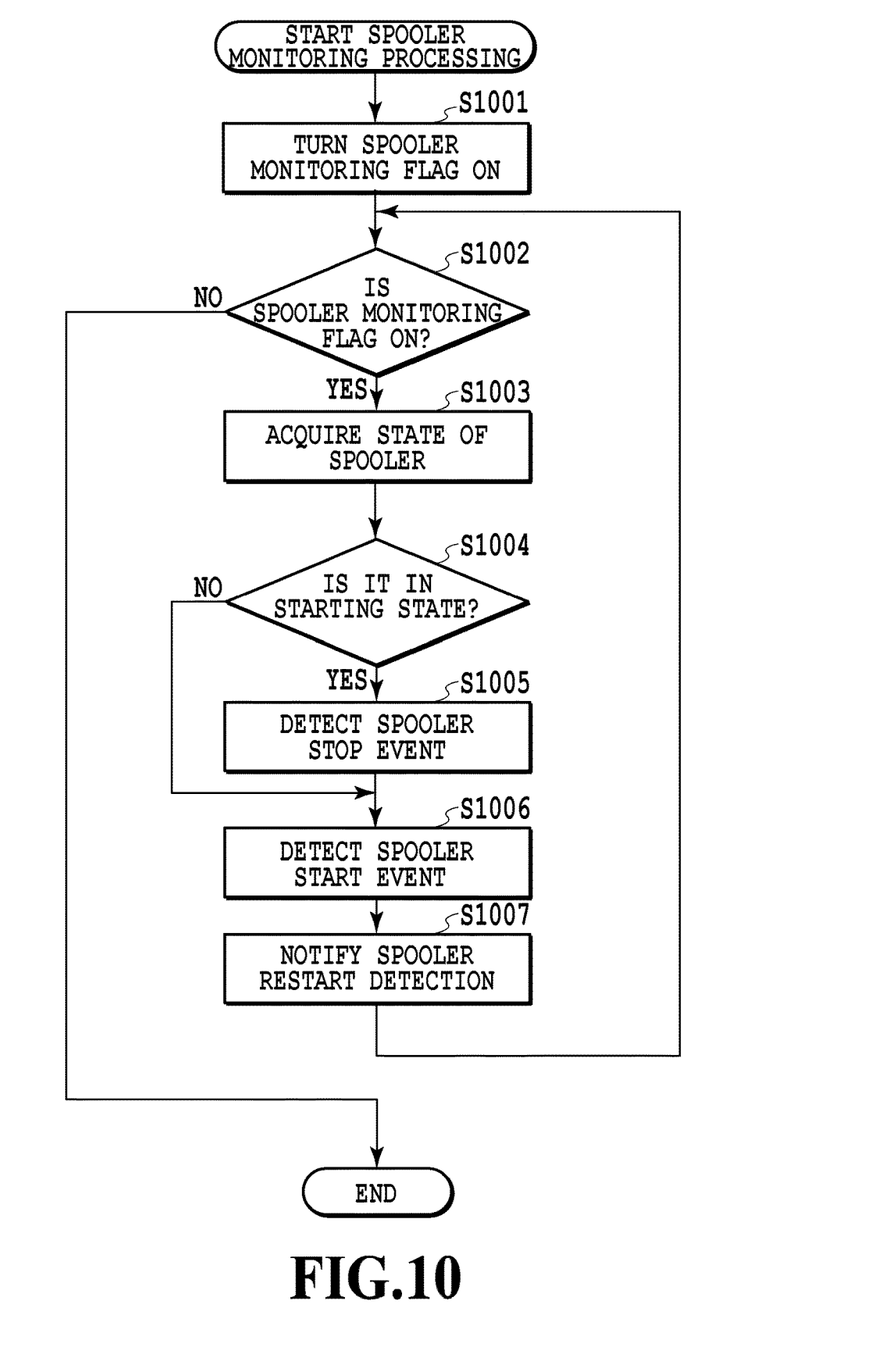
FIG. 10 is a flowchart for illustrating monitoring processing for a spooler.

FIG. 10 is a flowchart for illustrating spooler monitoring processing to be executed by the CPU 103 by using the spooler restart detection module 845. The processing starts from Step S900 in FIG. 9, and is concurrently made using a thread different from that of the monitoring processing illustrated in FIG. 9.

At the start of the processing, the spooler restart detection module 845 firstly sets the spooler monitoring flag on in Step S1001. In succeeding Step S1002, the spooler restart detection module 845 confirms whether the spooler monitoring flag is on or off. In a case where the flag is off, the processing ends. On the other hand, in a case where the flag is on, the process proceeds to Step S1003 to acquire the state of a spooler service.

In Step S1004, the spooler restart detection module 845 determines, based on information acquired in Step S1003, whether the spooler service is in a starting state. In a case of being in the starting state, the process proceeds to Step S1005 to wait for a spooler stop event, and upon detecting the event, the process then proceeds to Step S1006. It should be noted that S1005 continues until detecting the spooler stop event. On the other hand, in a case where the spooler service is determined not to be in the starting state in Step S1004, the process jumps to Step S1006.

In Step S1006, the spooler restart detection module 845 waits for the spooler start event, and upon its detection, the process then proceeds to Step S1007. In Step S1007, the spooler restart detection module 845 notifies the event determination module 843 that the restart of the spooler is detected, and the process returns to Step S1002 to continue the state of monitoring. Then, the above-described monitoring processing continues until the spooler monitoring flag is set to be off in Step S910 of FIG. 9.

According to the present embodiment as described above, even if the spooler restarts during monitoring by the monitoring application 841, the monitoring application 841 can detect this and an event for the device icon (print queue) to be monitored can be immediately reregistered. Specifically, the monitoring application 841 receives a notice of S1007 to determine as YES in S904, and the process returns to S901 of FIG. 9 to reregister the event for the device icon (print queue) of the printer 260 to be monitored. As a result, the status can be grasped at an appropriate timing without overlooking the occurrence of the event in the device icon (print queue).

Other Embodiments

In the above-described embodiments, installation and registration of the monitoring application have been explained by using three methods as illustrated in FIG. 4 through FIG. 6, but the present invention is not limited to these methods. For example, service registration and other modules may perform a resident startup registration for the monitoring application 241.

Alternatively, the monitoring application registration module 212 (222) may also be startup-registered for the monitoring application 241 to a startup folder of a user not having been logged in or to a default startup folder. Due to this, the monitoring application 241 can make a resident startup even under an environment in which a user has not yet logged in or the user has prepared a new account.

Further, the registration and startup of the monitoring application may not necessarily be made along with the startup of the status management program 231. For example, another embodiment may be used for the registration and startup at a timing at which the printer driver 221 displays a print setting screen or upon activating the monitoring application 241 by clicking a toast.

Also, in the first and second embodiments, the method of monitoring the print queue in the PC 210 and detecting an event occurred in the print queue has been adopted, but a method of registering an event for the printer 260 may also be adopted. In this case, once printing is performed by the printer 260 or an error occurs, the printer 260 notifies the monitoring application of an event, and upon receiving such notification, the monitoring application starts the status management program 231.

Furthermore, as described above, the printer has been used as an example of the image processing apparatus that provides status information to the information processing apparatus, but, as a matter of course, the present invention is not limited to such an embodiment. For example, a scanner that provides image data read by scanning a document to the information processing apparatus or a copying machine that provides a function of further copying the read image may be used as the image processing apparatus 150 of the present invention. In such a case, an advantageous result similar to that of the above embodiments can be produced as long as the progress state of read processing of the document and the like is provided to the information processing apparatus as status information.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-158735 filed Aug. 12, 2016, which is hereby incorporated by reference wherein in its entirety.

What is claimed is:

1. An information processing apparatus which is connected to an image processing apparatus, the information processing apparatus comprising:
at least one processor executing instructions to act as:
an activation control unit configured to activate a status management program for acquiring and displaying information relating to a state of the image processing apparatus;
a generation unit configured to generate a print job in the information processing apparatus and unable to activate the status management program in accordance with an instruction to generate a print job;
a registration unit configured to register the image processing apparatus or a print queue corresponding to the image processing apparatus to a spooler service as a target of monitoring;
an event determination unit configured to detect occurrence of an event in the image processing apparatus or the print queue according to a notification from the spooler service, and
a detection unit configured to detect a restart of a spooler service,
wherein the activation control unit is software that differs from the generation unit and activates the status management program in a case where the event determination unit detects the event, and
the registration unit reregisters the image processing apparatus or a print queue corresponding to the image processing apparatus to a spooler service as the target of monitoring in a case where the detection unit detects the restart of the spooler service.

2. The information processing apparatus according to claim 1, wherein the at least one processor also executes instructions to act as a program registration unit included in an installer for installing the status management program, wherein the program registration unit registers the activation control unit.

3. The information processing apparatus according to claim 1, wherein the at least one processor also executes instructions to act as a program registration unit accompanied with the status management program, wherein the program registration unit registers the activation control unit.

4. The information processing apparatus according to claim 1, wherein the activation control unit is registered in a case where printing of the image processing apparatus is performed.

5. The information processing apparatus according to claim 1, wherein the image processing apparatus is a printer which performs a printing operation based on a print job provided by the information processing apparatus.

6. The apparatus according to claim 1, wherein the generation unit is a printer driver.

7. A control method of an information processing apparatus which is connected to an image processing apparatus, the method comprising:
causing an activation control unit to activate a status management program for acquiring and displaying information relating to a state of the image processing apparatus;
causing a generation unit to generate a print job in the information processing apparatus while being unable to activate the status management program in accordance with an instruction to generate a print job;
registering the image processing apparatus or a print queue corresponding to the image processing apparatus to a spooler service as a target of monitoring;
detecting occurrence of an event in the image processing apparatus or the print queue according to a notification from the spooler service;
detecting a restart of a spooler service,
wherein the activation control unit is software that differs from the generation unit, and
the activation control unit activates the status management program in a case where the event determination unit detects the event; and reregistering the image processing apparatus or a print queue corresponding to the image processing apparatus to a spooler service as the target of monitoring in a case where the restart of the spooler service is detected.

8. The control method according to claim 7, wherein the activation control unit is registered in a case where printing of the image processing apparatus is performed.

9. The control method according to claim 7, wherein the image processing apparatus is a printer which performs a printing operation based on a print job provided by the information processing apparatus.

10. The method according to claim 7, wherein the print job is generated using a printer driver.

11. A non-transitory computer-readable storage medium storing a program for causing an information processing apparatus which is connected to an image processing apparatus to perform a control method, the control method comprising:

causing an activation control unit to activate a status management program for acquiring and displaying information relating to a state of the image processing apparatus;

causing a generation unit to generate a print job in the information processing apparatus while being unable to activate the status management program in accordance with an instruction to generate a print job;

registering the image processing apparatus or a print queue corresponding to the image processing apparatus to a spooler service as a target of monitoring;

detecting occurrence of an event in the image processing apparatus or the print queue according to a notification from the spooler service;

detecting a restart of a spooler service, wherein the activation control unit is software that differs from the generation unit, and  the activation control unit activates the status management program in a case where the event determination unit detects the event; and  reregistering the image processing apparatus or a print queue corresponding to the image processing apparatus to a spooler service as the target of monitoring in a case where the restart of the spooler service is detected.

12. The storage medium according to claim 11, wherein the activation control unit is registered in a case where printing of the image processing apparatus is performed.

13. The storage medium according to claim 11, wherein the print job is generated using a printer driver.

* * * * *